United States Patent
Shibuya

(10) Patent No.: US 6,809,996 B2
(45) Date of Patent: Oct. 26, 2004

(54) OPTICAL HEAD, OPTICAL RECORDING/REPRODUCING APPARATUS AND LASER MODULE

(75) Inventor: Giichi Shibuya, Tokyo (JP)

(73) Assignee: TDK Corporation, Tokyo (JP)

(*) Notice: Subject to any disclaimer, the term of this patent is extended or adjusted under 35 U.S.C. 154(b) by 352 days.

(21) Appl. No.: 09/871,897

(22) Filed: Jun. 4, 2001

(65) Prior Publication Data

US 2001/0053110 A1 Dec. 20, 2001

(30) Foreign Application Priority Data

Jun. 14, 2000 (JP) .................................. P. 2000-178315

(51) Int. Cl.⁷ .................................................. G11B 7/00
(52) U.S. Cl. .......................... 369/44.37; 369/44.38; 369/44.41; 369/53.28; 369/112.05
(58) Field of Search .......................... 369/44.37, 44.38, 369/44.41, 53.28, 112.05

(56) References Cited

U.S. PATENT DOCUMENTS 5,222,055 A * 6/1993 Fujita ....................... 369/44.37
5,295,125 A * 3/1994 Oonishi et al. ........... 369/44.37
5,982,733 A * 11/1999 Yanagawa et al. ....... 369/44.37
6,339,562 B1 * 1/2002 Sakai ....................... 369/44.23

FOREIGN PATENT DOCUMENTS

JP           9-97448 A        4/1997

* cited by examiner

Primary Examiner—W. R. Young
Assistant Examiner—J. Ortiz-Criado
(74) Attorney, Agent, or Firm—Oblon, Spivak, McClelland, Maier & Neustadt, P.C.

(57) ABSTRACT

Two light sources radiating two light beams having different wavelengths are simultaneously operated. Reflected beams of these two types of laser beams from an optical recording medium are simultaneously detected by two detectors. When one of the two types of light beams having different wavelengths is used while being focused on an optical recording medium, the spot diameter of the other non-focused metering beam on the optical recording medium is set larger than that of the one of the two light beams. A reflected light having a larger spot diameter is used to reduce DC offset in a tracking error signal.

6 Claims, 4 Drawing Sheets

OPTICAL HEAD, OPTICAL RECORDING/ REPRODUCING APPARATUS AND LASER MODULE

BACKGROUND OF THE INVENTION

The present invention relates to optical recording/ reproducing apparatus using an optical head and an LD module used for the optical recording/reproducing apparatus and the optical head.

In the current situation where various types of optical discs are available on the market, an optical head mounting two types of light sources having different wavelengths are in widespread use in order to support discs of a plurality of specifications. At the same time, a laser module (LD module) mounting two types of light sources having different wavelengths on a single chip is proposed (Japanese Patent Laid-Open No. 120568/1997). An optical head mounting such an LD module is used so that the light beam of each wavelength is individually turned on according to the type of an optical recording medium used for recording/ reproducing and a recording signal of a desired medium is read.

For a photo-detection device required to read information from an optical recording medium, it is necessary to generate error signals used for tracking servo as well as a high-frequency signal (generally called an RF signal) containing recorded information. A plurality of designs, in a variety of forms, are required for a single light beam. Further, such an optical head requires means for separating an outgoing light from a light source and a reflected light from an optical recording medium from the same optical axis. A laser module used for this purpose are so designed as to comprise such split photo-detection devices and means for separating a light.

One of the tracking error detection methods is a 3-beam method according to the Japanese Patent Laid-Open No. 162457/1994. This method comprises two side beams exclusively used for tracking servo as well as a main light beam for reading recorded information on an LD module optical recording medium (of which the representative example is an optical disc). This method is characterized by a small DC offset caused by a shift of an objective lens in the radial direction of an optical disc and less subject to various groove parameters such as bit depth and size of an optical disc and ensures stable servo performance. Thus the method is one of the tracking error detection methods now in widespread use.

The aforementioned 3-beam method is disadvantageous in that it has to generate two separate side beams on top of a main beam, thus reducing the quantity of light of the main beam. Further, photo-detection devices for individually receiving side beams is also needed. This requires a correspondingly wider area reserved for photo-detection devices than in other methods. This problem presented no particular influence for an optical head according to the conventional discrete method where elements or circuits are not integrated and parts having a single function are arranged. However, in a laser module where a light source and a photo-detection device and optical splitting means are integrated onto a single element makes it difficult to reserve the area for photo-detection devices without being affected by a backlight. Moreover, in a two-wavelength laser module equipped with the aforementioned two types of light sources and independent photo-detection devices, this problem is more difficult and required solution via some method.

One method for solving the problem of the area for photo-detection devices, that is, reduction of the device mounting area, is use of the tracking methods that do not utilize side beams. The methods using main beams alone and not side means include (1) a method where an RF signal is used to generate a tracking error signal (hereinafter referred to as the TE signal), such as the phase difference detection method according to the Japanese Patent Laid-Open No. 269588/1998 and the heterodyne method; and (2) a method that uses only a main beam without using an RF signal, such as the push-pull method.

Of these method, the method under (1) cannot be applied to media that require tracking servo for an unregistered portion, such as the CD-R and DVD-R. The push-pull method splits a detector composed of a photo-detection device that receives a reflected light of a main beam spot into four devices by a split line in the track direction and a split line in the radial direction. The push-pull method obtains a tracking error signal via an arithmetic operation circuit from output of each photo-detection device and uses the TE for tracking control, since TE=0 when a spot is in the center of a track (pit) but TE>0 or TE<0 when the spot is deflected rightward or leftward.

The push-pull method under (2) is the easiest method to obtain a tracking error signal and has been widely used since the dawn of development of the optical recording system. However, in the push-pull method, position and intensity of the spot on the detector composed of photo-detection devices may vary in case an objective lens is driven by a tracking coil and is moved in radial direction of a disc relative to another optical system, or in case a disc is inclined to an objective lens. This causes direct current variation in the generated tracking error signal. This direct current variation is called DC offset.

When tracking servo is applied with a DC offset component contained, the tracking performance is considerably degraded, in particular when a disc with large eccentricity is used, causing a possible out-of-tracking error. Thus, the push-pull method is typically used with means for removing the DC offset.

As means for removing the DC offset according to the related art, a method is known where DC offset to accompany the eccentricity of a disc is estimated in advance, and after appropriate leaning, the offset amount is corrected in performing tracking servo. Another method according to the related art is known where tracking performance in the direction of the thread of an optical head is upgraded to minimized the lens shift. Another method according to the related art is known where a mirror area (area without tracks or pits) is provided on a disc and tracking servo is applied while correcting the offset in the mirror section.

These methods require complicated signal processing, mechanism section with good response characteristics, or specially formatted discs. Thus, these methods are not often used in actual applications.

SUMMARY OF THE INVENTION

The invention, in view of the problems of the related art, aims at providing an optical head or optical recording/ reproducing apparatus mounting two types of light sources, the optical head or optical recording/reproducing apparatus having a function to reduce DC offset and requiring a smaller number of photo-detection devices and smaller device mounting area than in the related art thus facilitating scale-down and an LD module used for the optical head or the optical recording/reproducing apparatus.

According to the first aspect of the invention, an optical head for optical recording/reproducing apparatus comprises:

two light sources for generating laser beams having different wavelengths; detectors individually arranged for laser beams having different wavelengths; and a diffraction device for guiding a reflected light beam from an optical recording medium to a detector having a corresponding wavelength, in that the optical head uses the output obtained from the detector to perform focus error detection and tracking error detection in an optical recording medium, that reflected light beams of laser beams from two light sources from the optical recording medium are simultaneously detected via split photo-detection devices, and that when one of the two beams having different wavelengths is focused on an optical recording medium for recording/reproducing, the spot diameter of the other non-focused metering beam on the optical recording medium is set larger than that of the one of the two light beams.

In this way, by simultaneously operating two types of light sources instead of operating only one light source that matches the type of an optical recording medium used as in an optical head according to the related art, with one light beam that matches the types of the optical recording medium radiated while focused on the recording surface and the other light beam used as a non-focused beam and assigned a larger spot diameter on the recording surface than the focused light beam, the spot of the side beam is radiated in a wide range over several tracks on the disc in the radial direction. Thus, the reflected light caused by the side beam contains a negligible track cross component caused by a beam spot crossing a track (component caused by the difference in intensity between a track groove and a land).

In other words, since the spot diameter of the side beam is increased, the cut-off frequency of the optical transfer parameter (OTP) for a non-focused metering beam is shifted to the lower frequencies. This removes a higher track cross component in the space frequency (reciprocal of the track pitch) and obtains a signal containing a DC offset component alone caused by lens shift, in case the non-focused metering beam is received by photo-detection devices split and arranged via split line in the tracking direction and the difference of the outputs is obtained.

Thus, according to the invention, design is made so that the space frequency component corresponding to the track pitch maybe removed via filtering effects, by making the spot diameter of a non-focused metering beam larger than that of a main beam.

In this way, according to the invention, two types of light sources are simultaneously operated so that a light beam from one source that matches the optical recording medium used can be use for reproducing of signals and for a focus error signal. This allows shared use of photo-detection devices while DC offset is being corrected, thus reducing the number of photo-detection devices.

According to the second aspect of the invention, the spot diameter of the non-focused light beam on an optical recording medium is set to 2.5 to 15 times as large as the spot diameter of the focused light beam on the optical recording medium.

In this way, setting the spot diameter of the non-focused light beam at least 2.5 times as large as that of the main light beam allows the spot of the side beam to be radiated in a wide range over several tracks on the disc in the radial direction. Thus, the reflected light caused by the non-focused metering beam contains a negligible track cross component caused by a beam spot crossing a track (component caused by the difference in intensity between a track groove and a land). Thus a tracking error signal containing negligible DC offset can be obtained. In particular, in case the width of the non-focused metering beam in the radial direction of a disc is at least the 2.5 times as large as the spot diameter of the focused metering beam, the amplitude of the track cross component after arithmetic operation can be maintained at least 90 percent the original track cross signal.

The upper limit of the spot diameter of a non-focused metering beam is restricted because the spot diameter must be in size not overlapping with the non-focused metering beam on a detector (photo-detection device). The upper limit is further restricted by the photo detection area of the detector of the side beam. Of these restrictions, the latter is more severe. One side of the detector is typically set to about 150 micrometers or below. In a design where the 10-fold magnitude is obtained between a disc and a photo-detection device in an optical head, the spot diameter of the non-focused beam is reasonably set to 15 micrometers or below. On the other hand, the spot diameter of the non-focused beam on a disc is about one micrometer thus the spot diameter of the non-focused beam is desirably 15 times or below the spot diameter of the main beam.

According to the third aspect of the invention, the outgoing direction of a laser beam from a light source for generating two types of laser beams having different wavelengths is deflected.

In this way, by deflecting the outgoing direction of a laser beam from two types of light sources, it is possible to control the difference in the spot diameter of two types of light beams on an optical recording medium.

According to the fourth aspect of the invention, the optical recording/reproducing apparatus has an arithmetic operation circuit that obtains a tracking error signal by using signal output of both light beams from photo-detection devices.

In this way, by obtaining a tracking error signal by using signal output of both light beams from photo-detection devices, a side beam and photo-detection devices for the side beam are no longer needed to correct DC offset, thus allowing the number of photo-detection devices to be reduced.

According to the fifth aspect of the invention, the optical recording/reproducing apparatus has an arithmetic operation circuit that obtains a tracking error signal by subtracting a tracking error signal according to the push-pull method from photo-detection devices for a non-focused laser beam from an original tracking error signal according to the push-pull method from photo-detection devices for a focused laser beam.

As in the optical recording/reproducing apparatus according to the fifth aspect of the invention, by obtaining a tracking error signal by using signal output of both light beams from photo-detection devices, a side beam and photo-detection devices for the side beam are no longer needed to correct DC offset, thus allowing the number of photo-detection devices to be reduced.

According to the sixth aspect of the invention, the optical recording/reproducing apparatus has a polarity selection circuit for inverting the polarity of the output of an arithmetic operation circuit for a tracking error signal via a signal for indicating the optical recording medium currently in use.

In this way, by selecting between inversion and non-inversion of the polarity of the output of an arithmetic operation circuit for a tracking error signal, depending on which an optical recording medium is currently used, it is possible to share an arithmetic operation circuit for obtaining a tracking error signal, thus simplifying the circuit configuration.

According to the seventh aspect of the invention, the LD module is used for an optical head according to any one of the first through fourth aspects of the invention or optical recording/reproducing apparatus according to any one of the fourth through sixth aspects of the invention.

An LD module used for an optical head or optical recording/reproducing apparatus in the aforementioned configuration is advantageous in that a non-focused metering beam can be used for correcting DC offset. This reduces the number of photo-detection devices and allows scale-down of the apparatus.

DETAILED DESCRIPTION OF THE PREFERRED EMBODIMENTS

Figure 1:
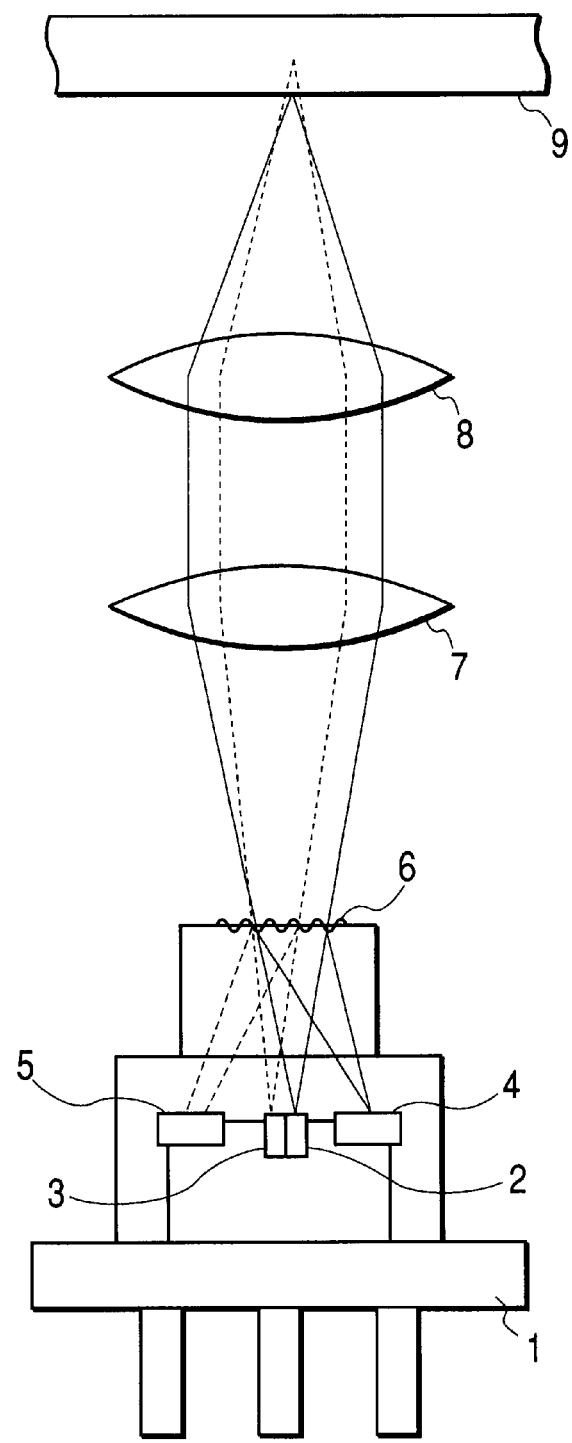
FIG. 1 is a block diagram showing an embodiment of an optical head according to the invention.

FIG. 1 is a block diagram showing an embodiment of an optical head according to the invention. In FIG. 1 are shown a laser module (LD module) 1 and the module comprises two types of light sources 2, 3 detectors 4, 5 composed of a split photo-detection devices, and a hologram diffraction device 6 that guides a reflected light beam from an optical medium to a corresponding photo-detection device of detectors 4, 5.

Also shown are a collimator lens 7, an objective lens 8 and an optical disc as an optical recording medium 9. In FIG. 2, light sources 2, 3 are the first light source for example as a DVD light source (emitting a laser beam having 650-nm wavelength) and the second light source as a CD light source (emitting a laser beam having 780-nm wavelength). While either of the first light source 2 and the second light source 3 was operated depending on the type of an optical recording medium 9 in apparatus according to the related art, these light sources 2, 3 are simultaneously operated and radiated on the optical recording medium 9 according to the invention.

Figure 2A:
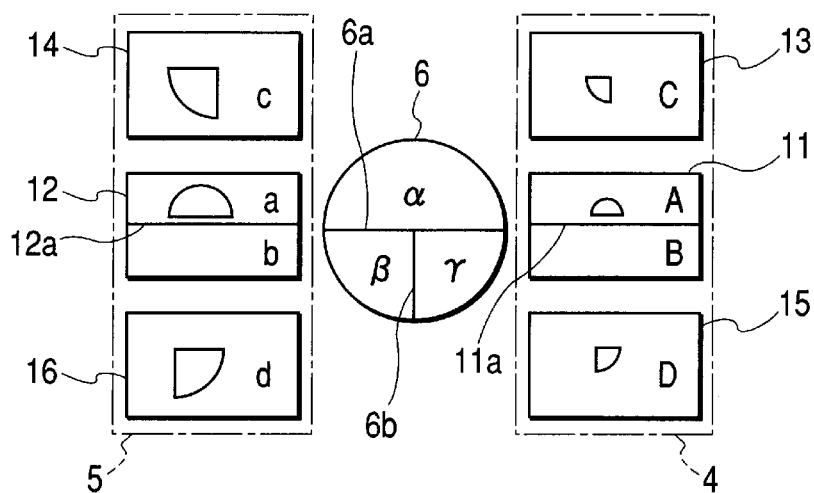
FIG. 2A is a view of a diffraction device and a detector according to an embodiment of the invention in the direction of an optical axis.

The hologram diffraction device 6 has the areas α, β, and γ (see FIG. 2A). The area α is split via a split line in the radial direction 6a against areas β and γ. Areas β and γ are split via a split line in the track direction 6b.

FIG. 2A shows the arrangement of detectors 4, 5. Photo-detection devices 11, 12 are photo-detection devices for receiving a reflected light from an optical disc diffracted in the area α of the hologram device 6 and for obtaining a focus error signal from a reflected light from an optical recording medium of a light beam coming from a light source 2 or 3. These photo-detection devices 11, 12 are split along the split lines in the radial direction 11a, 12a and determines the focus error on the optical recording medium 9 according to whether the signal corresponding to the result of the arithmetic operation (A–B) or (a–b) as output of the split areas is positive or negative.

Photo-detection device 13 or 14 receives diffracted output of the area β of the hologram diffraction device 6, among reflected lights radiated from the light source 2 or 3 and reflected from the optical recording medium 9. Photo-detection device 15 or 16 receives diffracted output of the area γ of the hologram diffraction device 6, among reflected lights radiated from the light source 2 or 3 and reflected from the optical recording medium 9.

Figure 2B:
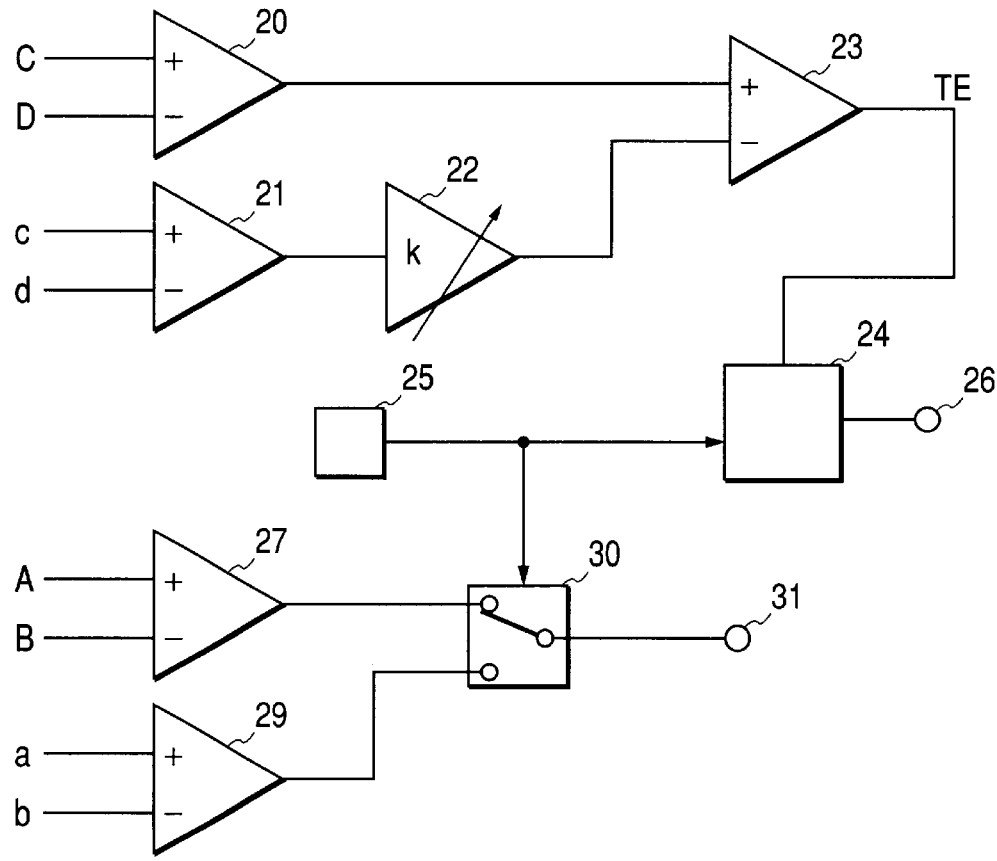
FIG. 2B is a circuit diagram for obtaining a tracking error signal and a focus error signal according to an embodiment of the invention.

FIG. 2B is an arithmetic operation circuit that obtains a tracking error signal from the photo-detection devices shown in FIG. 2A. An arithmetic operation circuit 20 obtains the difference between the outputs C, D of the photo-detection devices 13, 15, an arithmetic operation circuit 21 obtains the difference between the outputs c, d of the photo-detection devices 14, 16, a factor circuit 22 matches the level of the DC offset of the arithmetic operation circuit 21 to that of the arithmetic operation circuit 20, and an arithmetic operation circuit 23 subtracts the output of the factor circuit 22 from the output of the arithmetic operation circuit 20. The output TE of the arithmetic operation circuit is represented by the following expression:

$$TE=(C-D)-k(c-d) \qquad (1)$$

A polarity selection circuit 24 selects the polarity of the output of the arithmetic operation circuit 23. The circuit 24 outputs the output signal of the arithmetic operation circuit 23 unchanged from a TE signal output terminal 26 in case optical recording medium detecting means 25 provided in the optical recording/reproducing apparatus is an optical recording apparatus addressed by the first light source 2. The circuit 24 outputs the output signal of the arithmetic operation circuit 23 with polarity inverted from the TE signal output terminal 26 in case optical recording medium detecting means 25 provided in the optical recording/reproducing apparatus is an optical recording apparatus addressed by the second light source 3.

An arithmetic operation circuit 27 obtains the difference in the output (A–B) from two areas split by a split line 11a of the photo-detection device 11, that is, a focus error signal assumed when the first light source 2 is used for recording and reproducing. An arithmetic operation circuit 29 obtains the difference in the output (a–b) from two areas split by a split line 12a of the photo-detection device 12, that is, a focus error signal assumed when the second light source 3 is used for recording and reproducing. An output selection circuit 30 selects the outputs from the arithmetic operation circuits 27, 29 via the output of the optical recording medium detecting means 25. An output terminal 31 of the output selection circuit 30 is used to obtain a focus error signal.

Figure 3A:
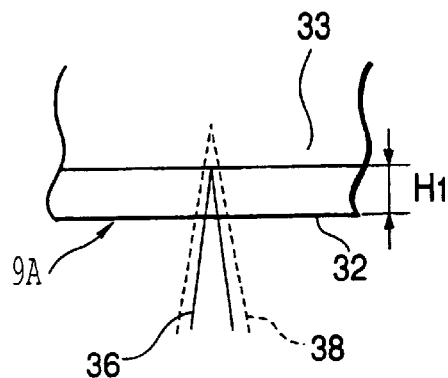
FIG. 3A is a side view showing the focused state of a light beam on an optical disc for recording/reproducing on two types of separate optical discs in an embodiment of the invention.

As shown in FIG. 3A, the thickness H1 from the label surface 32 to the recording surface 33 of an optical disc 9A for DVD addressed by the first light source 2 is approximately 0.6 mm. On the other hand, as shown in FIG. 3B, the thickness H2 from the label surface 34 to the recording surface 35 of an optical disc 9B for CD addressed by the second light source 3 is approximately 1.2 mm.

Figure 3B:
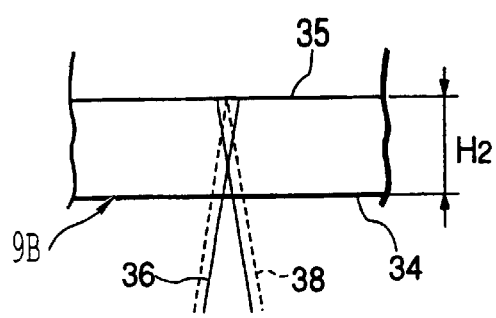
FIG. 3B is a side view showing the non-focused state of a light beam on an optical disc for recording/reproducing on two types of separate optical discs in an embodiment of the invention.
Figure 3C:
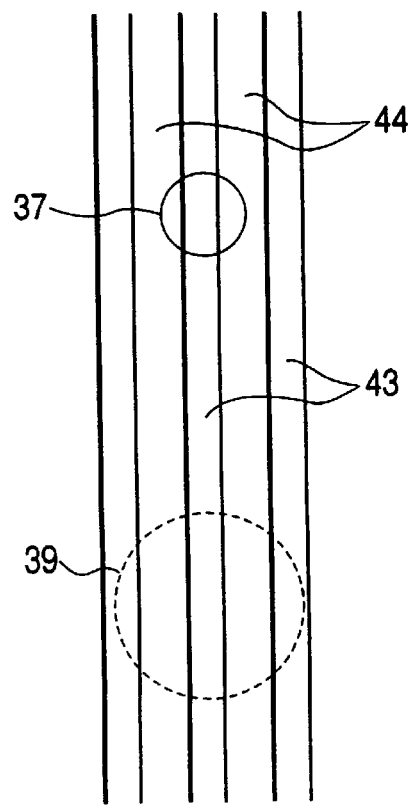
FIGS. 3C and 3D explain the size of each of the spots radiated on an optical disc in an embodiment of the invention.

Thus, as shown in FIG. 3A, in case a light beam 36 from the first light source 2 is focused on the optical disk 9A for recording/reproducing, the diameter of a spot 39 created by a light beam 38 radiated from the second light source 3 on the recording surface 33 is larger than that of a spot 37 created by a light beam 36 radiated from the light source 2 on the recording surface 33, as shown in FIG. 3C.

Figure 3D:
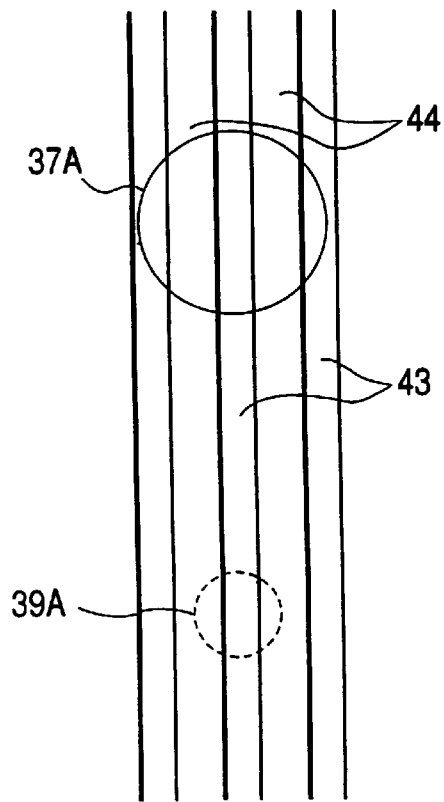

On the other hand, as shown in FIG. 3B, in case a light beam 38 from the second light source 3 is focused on the optical disk 9B for recording/reproducing, the diameter of a spot 37A created by a light beam radiated from the first light source 2 on the recording surface 35 is larger than that of a spot 39A created by a light beam 38 radiated from the second light source 3 on the recording surface 35, as shown in FIG. 3D.

When recording/reproducing is made on an optical disc 9A or 9B by using a light source 2 or 3, a track cross signal obtained as the output (C−D) of the arithmetic operation circuit 20 or the output (c−d) of the arithmetic operation circuit 21 contains the DC offset.

In case recording/reproducing is made on an optical disc 9A by using for example the first light source 2, a light beam spot 39 is radiated over a plurality of track grooves 43 or lands 44, thus the output of the arithmetic operation circuit 21 contains a negligible signal comprising the track cross component.

Figure 4A:
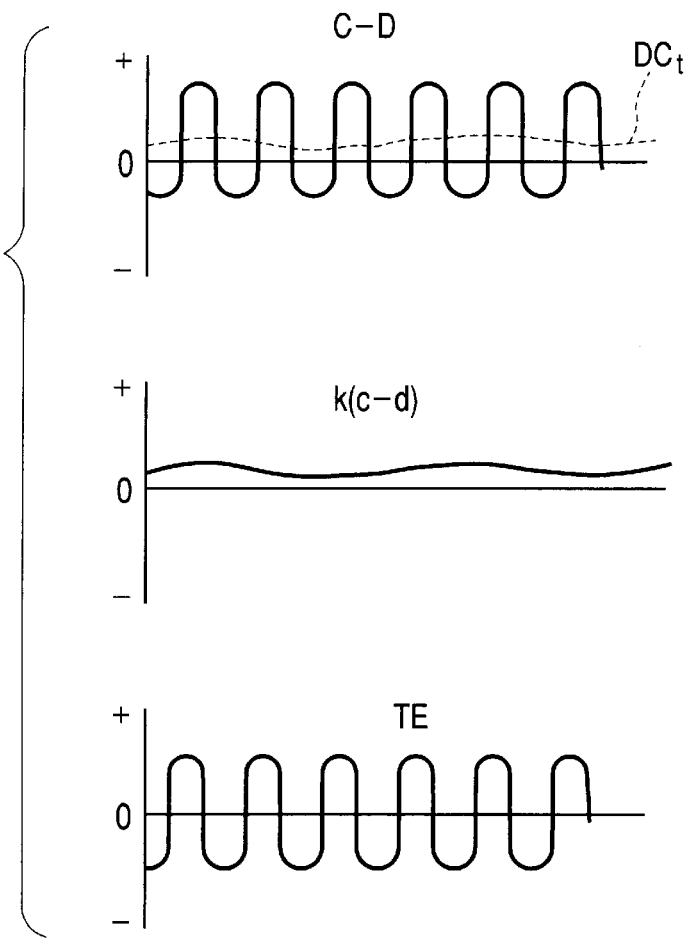
FIG. 4A is a waveform diagram explaining the operation of the circuit shown in FIG. 2B.

When the objective lens 8 has shifted in the radial direction relative to an optical system other than the objective lens 8 such as a light source 2 or a detector 4, 5 via tracking servo, this results in a difference in intensity of the reflected light caused by misalignment of the optical axis corresponding to the shift, in the outputs of split photo-detection devices 13, 15 of the detector 4, which difference displays the amount of the DC offset contained in the output (C−D) of the arithmetic operation circuit 20 shown in FIG. 4A.

On the other hand, the output (c−d) of the arithmetic operation circuit 21 contains little track cross component and contains only the DC offset. By multiplying the level of the DC offset by the factor k in the factor circuit 22, obtaining the output shown by k(c−d) in FIG. 4A in accordance with the DC offset DCf in FIG. 4A, then performing operation of the formula (1), a TE signal with DC offset removed as indicated by TE in FIG. 4A is obtained. In this case, the polarity selection circuit 24 outputs from the TE signal output terminal 26 the TE signal obtained from the optical recording medium detecting means 25 without inverting the polarity of the signal.

In contrast, when recording/reproducing is made on an optical disc 9B by using the second light source 3, the diameter of a spot 39A created by the second light source 3 on the optical disc 9B is smaller than that of a spot 37A created by the first light source 2 on the optical disc 9B. In this case, the output k(c−d) of the arithmetic operation circuit 22 in FIG. 2 is subtracted from the output (C−D) of the arithmetic operation circuit 20 to remove DC offset and the polarity of the obtained A output is inverted via the polarity selection circuit 24 and the resulting signal is output as a TE signal from the TE signal output terminal 26.

In case recording/reproducing is made by using the first light source 2, the output selection circuit 30 selects the output (A−B) of the arithmetic operation circuit 27 and outputs this signal as a focus error signal from the terminal 31. (A−B)>0 means that the focus is too near, (A−B)=0 means that the focus is just on the target, and (A−B)<0 means that the focus is too far. In case recording/reproducing is made by using the second light source 3, the output selection circuit 30 selects the output (a−b) of the arithmetic operation circuit 29 and outputs this signal as a focus error signal from the terminal 31.

In case a TE signal is obtained via the aforementioned operation, it is confirmed that the ratio of the spot diameter must be at least 2.5 times in order to maintain the amplitude of the track cross component after arithmetic operation at least 90 percent the original track cross signal. The spot diameter ratio is preferably set to 15 times or below because the size of a non-focused metering beam must be selected so that the beam does not overlap with the focused metering beam on the photo-detection device and because the photo-detection area of the photo-detection device is restricted.

According to the invention, two types of light sources can be operated at the same time. The light beam from one light source 2 (or 3) that matches the optical recording medium can be used for regenerating signals and for a focus error signal. The signal from the other light source 3 (or 2) can be used for correcting DC offset. Thus photo-detection devices can be shared while DC offset is being corrected. This allows the number of photo-detection devices to be reduced. In particular, a total of 10 photo-detection devices are required in the example according to the Japanese Patent Laid-Open No. 9-120568/(1997) where too light sources are mounted. According to the invention, only a total of six photo-detection devices are required.

Figure 4B:
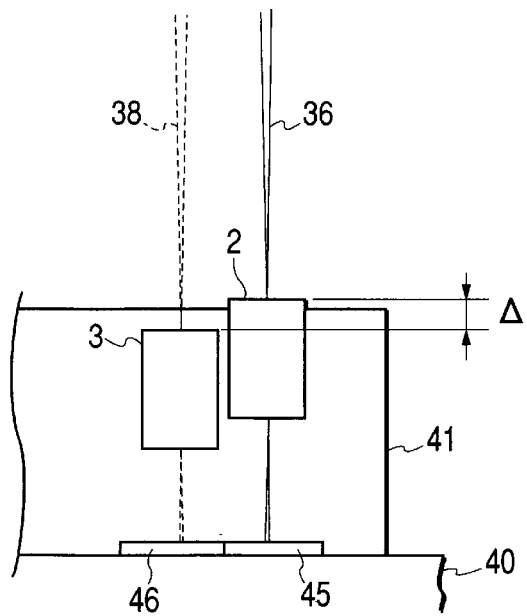
FIG. 4B is a side view showing an example of arrangement of light sources assumed when the invention is implemented.

In implementing the invention, it is possible to preferably set the ratio between spot diameters on the optical disc by deflecting the outgoing direction of laser beams from two light sources 2, 3 by Δ as shown in FIG. 4B and setting the deflection amount Δ as required. The deflection amount Δ must be adjusted as required within the range where the influence caused by eclipse due to a stem 41 provided on an optical base 40 in order to bond parts, according to the optical system design of an optical head using an LD module as a part. As an example, the deflection amount Δ is set to 75 micrometers.

Since the two types of light sources 2, 3 are turned on and used at a time, it is possible to automatically control the output power from the light sources independently by providing individual photo-detection devices 45, 46 for monitoring outgoing beams.

It is possible to reduce the number of manufacturing processes and number of parts without requiring a reflecting mirror by mounting light sources 2, 3 while assuring that the radiating surfaces of the light sources 2, 3 are oriented in the direction of an optical disc.

According to the first aspect of the invention, two types of light sources, that is, a light source not used for recording/reproducing and a light source used for recording/reproducing are operated simultaneously. One light beam used for recording/reproducing is radiated and focused on the recording surface of a disc and the other light beam is used as a non-focused beam so that the spot diameter of the latter on the recording surface is larger than that of the former. This allows shared use of photo-detection devices while DC offset is being corrected, thus reducing the number of photo-detection devices.

According to the second aspect of the invention, the spot diameter of the non-focused light beam on an optical recording medium is set to at least 2.5 times as large as the spot diameter of the focused light beam on the optical recording medium. Thus, the reflected light caused by the non-focused metering beam contains a signal comprising a negligible track cross component caused by a beam spot crossing a track. As a result, a tracking error signal containing negligible DC offset can be obtained. The spot diameter of the non-focused light beam on an optical recording medium is set to 15 times or below as large as the spot diameter of the focused light beam on the optical recording medium. Thus restriction on the photo-detection area of a photo-detection device of detector is not applied. Moreover, overlapping of received beams on a detector can be prevented.

According to the third aspect of the invention, the outgoing direction of a laser beam from two types of light sources is deflected. Thus it is possible to control as required the difference in the spot diameter of two types of light beams on an optical recording medium.

According to the fourth aspect of the invention, by obtaining a tracking error signal by using signal output of both light beams from photo-detection devices, a side beam and photo-detection devices for the side beam are no longer needed to correct DC offset, thus allowing the number of photo-detection devices to be reduced.

According to the fifth aspect of the invention, by obtaining a tracking error signal by using signal output of both light beams from photo-detection devices, a side beam and photo-detection devices for the side beam are no longer needed to correct DC offset, thus allowing the number of photo-detection devices to be reduced.

According to the sixth aspect of the invention, by selecting between inversion and non-inversion of the polarity of the output of an arithmetic operation circuit for a tracking error signal, depending on which an optical recording medium is currently used, it is possible to share an arithmetic operation circuit for obtaining a tracking error signal, thus simplifying the circuit configuration.

According to the seventh aspect of the invention, an LD module is used for an optical head according to any one of the first through fourth aspects of the invention or optical recording/reproducing apparatus according to any one of the fourth through sixth aspects of the invention. Thus a non-focused metering beam can be used for correcting DC offset. This reduces the number of photo-detection devices and allows scale-down of the apparatus.

What is claimed is:

1. An optical head for optical recording/reproducing apparatus comprising:
    two light sources for generating two laser beams having different wavelengths;
    a diffraction device for guiding a reflected light beam from an optical recording medium to one of two detectors individually arranged and having a corresponding wavelength,
    wherein said optical head uses an output obtained from said one of the two detectors to perform focus error detection and tracking error detection in the optical recording medium,
    reflected light beams of laser beams from said two light sources from the optical recording medium are simultaneously detected via split photo-detection devices, and
    when one of the two beams is focused on the optical recording medium for recording or reproducing, a spot diameter of the other non-focused beam on the optical recording medium is set larger than a spot diameter of said one of the two light beams, and
    the other non-focused beam is used for at least one of focus error detection and tracking error detection,
    wherein the spot diameter of the non-focused light beam on an optical recording medium is set to 2.5 to 15 times as large as the spot diameter of said focused light beam on the optical recording medium.

2. An optical head according to claim 1, wherein an outgoing direction of a respective laser beam from a corresponding light source of the two light sources is deflected, and
    wherein the two light sources are accommodated in a single package.

3. An optical head according to claim 1, wherein an outgoing direction of a respective laser beam from a corresponding light source of the two light sources is deflected, and
    wherein the two light sources are accommodated in a single package.

4. An optical recording/reproducing apparatus comprising:
    an optical head comprising:
        two light sources for generating two laser beams having different wavelengths;
        a diffraction device for guiding a reflected light beam from an optical recording medium to one of two detectors individually arranged and having a corresponding wavelength,
        wherein said optical head uses an output obtained from said one of the two detectors to perform focus error detection and tracking error detection in the optical recording medium,
        reflected light beams of laser beams from said two light sources from the optical recording medium are simultaneously detected via split photo-detection devices,
        when one of the two beams is focused on the optical recording medium for recording or reproducing, a spot diameter of the other non-focused beam on the optical recording medium is set larger than a spot diameter of said one of the two light beams, and
        the other non-focused beam is used for at least one of focus error detection and tracking error detection; and
    an arithmetic operation circuit that obtains a tracking error signal by using a signal output of both light beams from the photo-detection devices,
    wherein the spot diameter of the non-focused light beam on an optical recording medium is set to 2.5 to 15 times as large as the spot diameter of said focused light beam on the optical recording medium.

5. An optical recording/reproducing apparatus comprising:
    an optical head comprising:
        two light sources for generating two laser beams having different wavelengths;
        a diffraction device for guiding a reflected light beam from an optical recording medium to one of two detectors individually arranged and having a corresponding wavelength,
        wherein said optical head uses an output obtained from said one of the two detectors to perform focus error detection and tracking error detection in the optical recording medium,
        reflected light beams of laser beams from said two light sources from the optical recording medium are simultaneously detected via split photo-detection devices,
        when one of the two beams is focused on the optical recording medium for recording or reproducing, a spot diameter of the other non-focused beam on the optical recording medium is set larger than a spot diameter of said one of the two light beams, and the other non-focused beam is used for at least one of focus error detection and tracking error detection; and an arithmetic operation circuit that obtains a tracking error signal by using a signal output of both light beams from the photo-detection devices, wherein said arithmetic operation circuit obtains a tracking error signal by subtracting a tracking error signal according to the push-pull method from the photo-detection devices for a non-focused laser beam from an original tracking error signal according to the push-pull method from the photo-detection devices for a focused laser beam.

6. An optical recording/reproducing apparatus according to claim 5, further comprising a polarity selection circuit for inverting a polarity of the output of an arithmetic operation circuit for a tracking error signal via a signal for indicating the optical recording medium is currently in use.

* * * * *